July 9, 1929.  E. F. W. ALEXANDERSON  1,719,866
CONTROL OF ELECTRIC POWER
Filed March 9, 1927
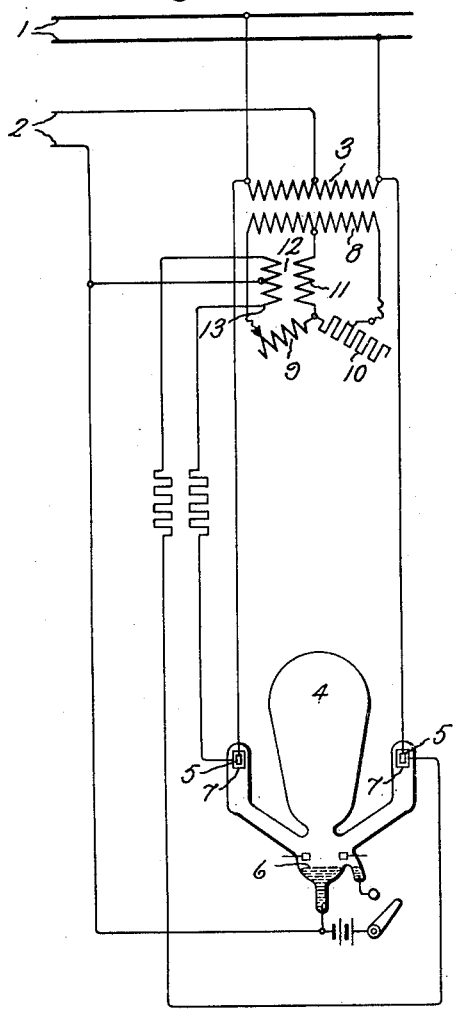
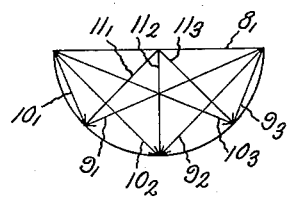
Inventor:
Ernst F. W. Alexanderson
by
His Attorney.

Patented July 9, 1929.

1,719,866

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

CONTROL OF ELECTRIC POWER.

Application filed March 9, 1927. Serial No. 174,069.

My invention relates to the control of the electrical power transmitted between alternating and direct current circuits through a vapor electric device, such as a mercury rectifier provided with a grid for controlling the current transmitted between its cathode and anode, and has for its principal object the provision of an improved apparatus and method whereby the grid potential of such devices may be readily controlled.

It is known that the current transmitted between direct and alternating current circuits through a vapor electric device may be controlled by adjusting the phase relation between the anode and grid potentials of the device. Thus no current is transmitted through the device when its grid and anode potentials are 180 degrees out of phase with one another. When the grid and anode potentials are in phase with one another, however, current is transmitted through the device during the entire positive half cycle of the anode voltage. Between these two limits, current starts through the device at an instant of time which gradually approaches the beginning of the positive half cycle of the anode potential as the grid and anode potentials are brought more nearly into phase with one another.

In accordance with my invention, an improved apparatus, which is operable to produce dephased voltages and to vary the magnitudes of these dephased voltages with respect to one another, is provided for controlling the phase relation between the grid and anode potentials of the device.

My invention will be better understood from the following description when considered in connection with the accompanying drawings and its scope will be pointed out in the appended claims.

Referring to the drawings, Fig. 1 is a wiring diagram of an apparatus connected in accordance with my invention; and Fig. 2 is a vector diagram relating to the operation of this apparatus.

This apparatus comprises alternating current terminals 1 and direct current terminals 2 which are interconnected through a transformer winding 3 and a vapor electric device 4. The device 4 is provided with anodes 5 which are connected to the opposite end terminals of the winding 3, with a cathode 6 which is arranged to be connected through the direct current terminals 2 and the direct current load to a terminal intermediate the ends of the winding 3, and with grids 7. The apparatus for controlling the potential of the grids 7 comprises a winding 8 which is arranged to operate at the same frequency as the winding 3, is provided with end terminals interconnected through a reactor 9 and an adjustable resistor 10, and is provided with an intermediate terminal connected through the primary circuit 11 of a transformer 12 to a terminal at the junction between the reactor 9 and resistor 10. The transformer 12 also comprises a secondary winding 13 provided with end terminals connected to the grids 7 and with an intermediate terminal connected to the cathode 6. Any suitable means may be provided for starting and maintaining an exciting arc within the device 4.

The operation of the apparatus will be explained by reference to Fig. 2 wherein the vector $8_1$ represents the voltage of the winding 8, the vectors $9_1$ and $10_1$ respectively represent the voltage drops of the reactor 9 and the resistor 10 for one adjustment of this resistor, the vectors $9_2$ and $10_2$ respectively represent the voltage drops of the reactor 9 and the resistor 10 for another adjustment of the resistor 10, the vectors $9_3$ and $10_3$ respectively represent the voltage drops of the reactor 9 and the resistor 10 for still another adjustment of the resistor, and the vectors $11_1$, $11_2$ and $11_3$ represent the voltages applied to the winding 11 for the various adjustments of the resistor.

It will be understood of course that the potentials of the anodes 5 alternate between positive and negative values and that current is transmitted through each anode only during a part or all of the half cycle when its potential is positive. The instant in each positive half cycle at which current starts through the left hand anode, for example, is determined by the phase relation between the potentials of this anode and the grid with which it is associated. Thus, for one adjustment of the resistor 10, the voltage $11_1$ will be applied to this grid and current will start through the anode at a comparatively early instant in the positive half cycle of the voltage applied to this anode. For another adjustment of the resistor 10, however, the voltage $11_2$ will be applied to this grid and current will start through the anode at a later instant in the positive half cycle of the anode voltage. It will be apparent that adjustment in the phase of the grid potential may also be produced either by adjustment of the reactor 9 or by adjustment of both the reactor 9 and the resistor 10.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is,—

1. The combination of alternating current terminals, a transformer comprising a winding arranged to operate at the same frequency as said alternating current terminals, a pair of elements connected to said winding for producing dephased voltages, and means connected between a terminal at the junction of said elements and a terminal intermediate the ends of said winding for producing a voltage having its phase determined by the relative magnitudes of said dephased voltages.

2. The combination of alternating current terminals, a transformer comprising a winding arranged to operate at the same frequency as said alternating current terminals, a reactor and a resistor connected to said winding in series with one another, and means connected between a terminal at the junction of said reactor and resistor and a terminal intermediate the ends of said winding for producing a voltage differing from the voltage of said terminals by a phase angle dependent on the relation between the voltage drops of said reactor and said resistor.

3. The combination of a pair of alternating current terminals, a transformer comprising a primary winding connected to said alternating current terminals and a secondary winding, a pair of elements connected to said secondary winding for producing dephased voltages, means connected between a terminal at the junction of said elements and a terminal intermediate the ends of said secondary winding for producing voltages having their phases determined by the relative magnitudes of said dephased voltages, and means for adjusting the relation between the magnitudes of said dephased voltages.

4. The combination of a pair of alternating current terminals, a transformer comprising a winding arranged to operate at the same frequency as said alternating current terminals, a reactor and a resistor connected to said winding in series with one another, means connected between a terminal at the junction of said reactor and resistor and a terminal intermediate the ends of said winding for producing voltages differing from the voltages of said alternating current terminals by a phase angle dependent on the relation between the voltage drops of said reactor and said resistor, and means for varying the voltage drop of said resistor.

5. The combination of a pair of alternating current terminals, a transformer comprising a winding arranged to operate at the same frequency as said alternating current terminals, a pair of elements connected to said winding for producing dephased voltages, and a transformer connected between a terminal at the junction of said elements and a terminal intermediate the ends of said winding for producing voltages which differ from the voltages of said alternating current terminals by a phase angle dependent on the relative magnitudes of said dephased voltages.

In witness whereof, I have hereunto set my hand this 8th day of March, 1927.

ERNST F. W. ALEXANDERSON.